United States Patent [19] [11] 3,918,494
Dalton [45] Nov. 11, 1975

[54] ROTARY ACTUATED DIRECTIONAL CONTROL VALVE
[75] Inventor: Thomas B. Dalton, Muskegon, Mich.
[73] Assignee: Westran Corporation, Muskegon, Mich.
[22] Filed: Dec. 13, 1973
[21] Appl. No.: 424,477

[52] U.S. Cl. .................. 137/625.23; 29/157.1 R
[51] Int. Cl.² ................. F16K 5/02; F16K 11/02
[58] Field of Search ..... 137/625.23, 625.17, 625.18, 137/625.19, 625.21, 625.22, 625.24; 29/157.1 R

[56] References Cited
UNITED STATES PATENTS

| 987,939 | 3/1911 | Anderson | 137/625.23 |
|---|---|---|---|
| 1,190,992 | 7/1916 | Evans | 137/625.23 |
| 2,374,714 | 5/1945 | Turchan et al. | 137/625.23 |
| 2,392,319 | 1/1946 | Harwood | 137/625.23 |
| 2,477,975 | 8/1949 | Frock | 137/625.23 |
| 2,926,697 | 3/1960 | Baker et al. | 137/625.23 |
| 2,985,191 | 5/1961 | Beckett et al. | 137/625.22 X |
| 3,134,403 | 5/1964 | Rudelick | 137/625.23 X |
| 3,146,795 | 9/1964 | Retallick | 137/625.23 X |
| 3,172,332 | 3/1965 | Strickland | 137/625.23 X |
| 3,480,042 | 11/1969 | Mueller et al. | 137/625.22 |

FOREIGN PATENTS OR APPLICATIONS

| 1,498,295 | 7/1969 | Germany | 137/625.19 |
|---|---|---|---|

Primary Examiner—Martin P. Schwadron
Assistant Examiner—Robert J. Miller
Attorney, Agent, or Firm—Gifford, Chandler & Sheridan

[57] ABSTRACT

A directional control valve for use in fluid power systems comprising a housing having a central through bore and a plurality of transverse bores intersecting the through bore, a cylindrical spool member rotatably mounted in the through bore and having annular segments removed therefrom, each of the annular segments having sufficient arc length to provide fluid communication between two of the transverse bores, and sealing means preventing leakage between the annular segments.

2 Claims, 12 Drawing Figures

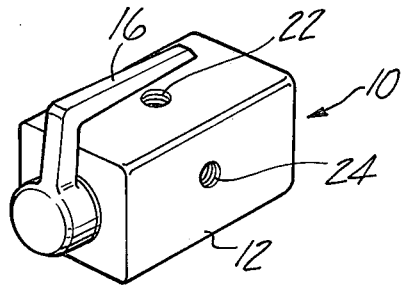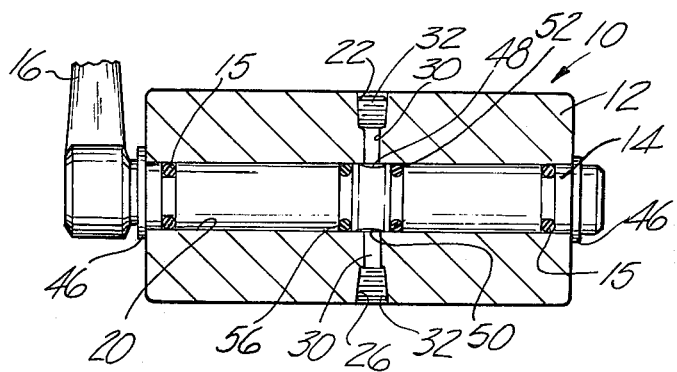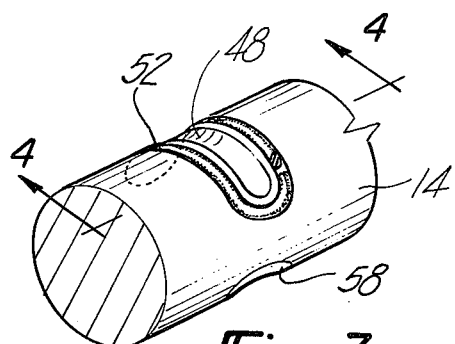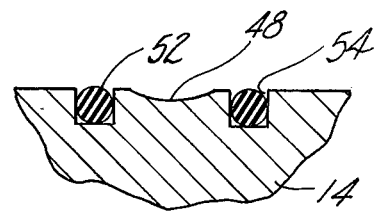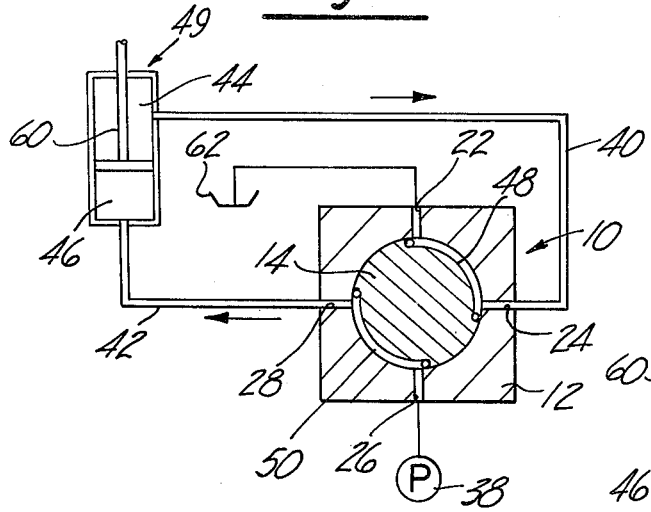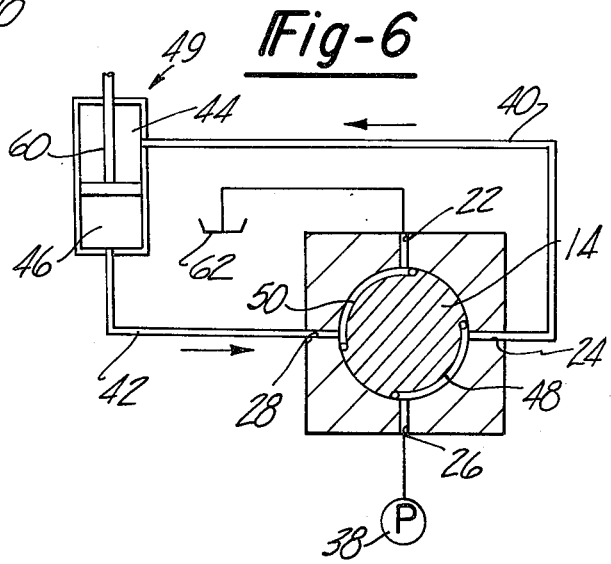

ROTARY ACTUATED DIRECTIONAL CONTROL VALVE

BACKGROUND OF THE INVENTION

I. Field of the Invention

The present invention relates to directional control valves and more particularly to directional control valves having rotatably mounted spool members with fluid passages formed in the spool members.

II. Description of the Prior Art

While many directional control valves are available which include a through bore in the housing and which provide porting between transverse bores by means of passages formed in a rotatably mounted spool, these valves are generally quite expensive. Most of the expense is related to the manufacture of the spool.

SUMMARY OF THE INVENTION

The present invention provides a valve that will perform quite satisfactorily without requiring expensive production machining. This is achieved by providing a spool member having port passages which can be formed by sawing, forging, or powdered metal forming techniques. Unique sealing means are included which serve to limit the leakage of the valve to a level normally attained only through the use of much more costly manufacturing techniques.

DESCRIPTION OF THE DRAWINGS

The above advantages and others will become obvious to those skilled in the art of directional control valves upon reference to the accompanying specification and drawings in which like numerals refer to like parts throughout the several views and in which:

FIG. 1 is a perspective view of a preferred valve of the present invention;

FIG. 2 is a longitudinal cross-sectional view of a preferred embodiment of the present invention;

FIG. 3 is a perspective view of the spool member of the preferred valve shown in FIG. 2;

FIG. 4 is a partial cross-sectional view taken substantially along line 4—4 of FIG. 3 illustrating the sealing means of the present invention;

FIG. 5 is a transverse cross-sectional view of the valve of the present invention the spool member in a first flow position;

FIG. 6 is a view similar to FIG. 5 but with the spool member in a second flow position;

DESCRIPTION OF THE PREFERRED EMBODIMENTS

Figure 7:
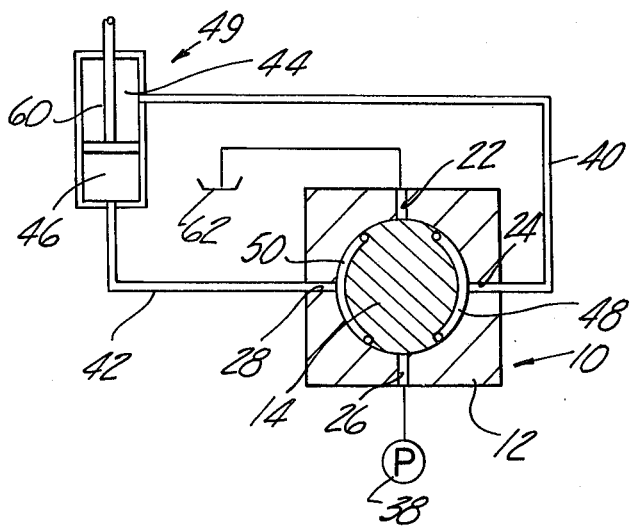
FIG. 7 is a view similar to FIGS. 5–6 with the valve member in the closed position.

Referring first to FIGS. 1 and 2, the preferred rotary actuated directional control valve 10 of the present invention is shown as including a housing 12, a valve spool member 14, actuating means 16 operatively connected to the spool member 14, and sealing means 15 disposed between the spool member 14 and the housing 12 at the ends of the spool member 14.

The housing 12 is preferably formed by casting or a similar process and by machining and is of appropriate external configuration to be mounted as required for the particular use for which it is chosen. The housing 12 is preferably elongated, having a through bore 20 formed along its axis of elongation. As can best be seen in FIGS. 5, 6, and 7, the housing 12 is provided with transverse intersecting bores 22, 24, 26 and 28 arranged to be mutually perpendicular to one another. As can best be seen in FIG. 2, each of the transverse bores 22, 24, 26 and 28 includes an inner conduit portion 30 and an outer threaded portion 32 suitable for connection to fluid conduits.

In the preferred embodiment, as may best be seen in FIGS. 5 thru 7, the bore 26 is illustrated as being connected to a pump 38, the bores 24 and 28 are respectively connected by conduits 40 and 42 to a retraction chamber 44 and an extension chamber 46 of a fluid cylinder 49. A piston 60 separates the chambers 44 and 46. It will be obvious to those skilled in the hydraulic art that the valve of the present invention can be connected to fluid devices other than the fluid cylinder 49 shown.

The valve spool member 14, as is best shown in FIG. 2, is generally cylindrical in shape and is rotatably mounted in the housing 12. Rotation is accomplished manually through the use of the actuating handle 16. Axial retention is provided by the use of snap rings 47 or similar commonly available retainers.

Two annular segments, 48 and 50, are removed from the outer surface of the spool member 14. Each is of sufficient arc length to allow fluid communication between adjacent transverse bores, as is best seen in FIGS. 5, 6, and 7. The cross sections of the segments 48 and 50 are essentially semicircular and their cross sectional areas are equal to or greater than those of the transverse bores 22, 24, 26 and 28.

Referring now to FIGS. 2, 3 and 4, leakage from the annular segments 48 and 50 is minimized by installation of O rings 52 and 56 in continuous grooves 54 and 58 which have a generally rectangular cross section and which are formed adjacent the circumference of segments 48 and 50, respectively. The volumes of grooves 54 and 58 are controlled to provide the O ring compression necessary to insure proper sealing.

In the preferred embodiment, owing to the simplified shapes described, both the annular segments 48 and 50 and the grooves 54 and 58 are formed by impact forging the spool member 14 in the shape described above. Another alternative is to form the spool member 14 from powdered metal to a shape closely approximating that described and machining away the small amount of excess material necessary to provide a smooth finish. Either technique offers significant cost reductions over machining valve spools from bar stock as is customarily done.

Referring now to FIGS. 5 thru 7, operation of the valve 10 of the present invention is as follows: With the spool member 14 in the position shown in FIG. 5 pressurized fluid from the pump 38 is directed to the extension chamber 46 of the cylinder 49 passing through the first transverse bore 26, the annular segment 50, the second transverse bore 28, and the fluid conduit 42. As the piston 60 of the cylinder 46 extends, low pressure fluid flows back to the fluid reservoir 62, passing through the fluid conduit 40, the third transverse bore 24, the annular segment 48 and the fourth transverse bore 22.

Clockwise rotation of 90° of the spool member 14, as shown in FIG. 6 allows fluid communication between the bores 24 and 26 through the annular segment 48 and between the bores 22 and 28 through the annular segment 50. This directs fluid under pressure to the retraction chamber 44 and relieves pressure from the extension chamber 46. Further rotation of the spool member 14 will restrict flow to and from the cylinder 49 until all flow stops when the closed position shown in FIG. 7 is reached.

The operation described is common to all variations of the valve of the present invention described here.

Other constructions of the spool member 14 are possible, however, which retain the operational characteristics of the valve 10 while employing other approaches to the problem of providing a directional control valve which includes highly simplified components.

Figure 8:
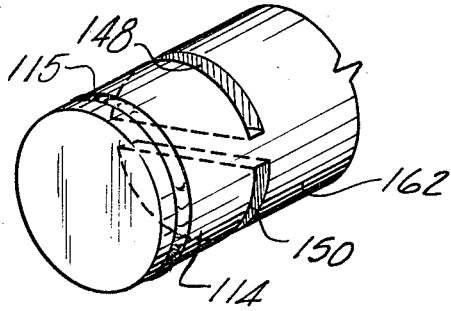
FIG. 8 is a perspective view of another preferred valve spool member of the present invention.

A first alternative spool configuration 114 shown in FIG. 8, includes annular segments 148 and 150 removed by the use of saw cuts into the external surface of the spool member 114. Sealing is provided by lapping the outer diameter 162 of the spool member 114 to provide a tight clearance between it and the mating through bore 20 of the valve 10 and by providing O-rings 115 at the ends of the spool 114.

Figure 9:
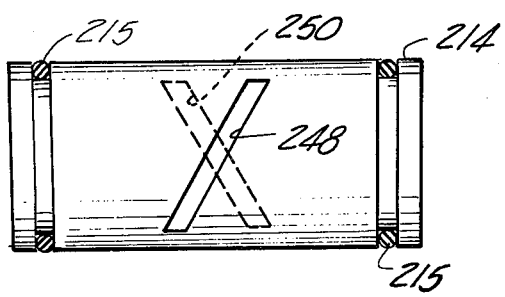
FIG. 9 is a plan view of still another valve spool member of the present invention.
Figure 10:
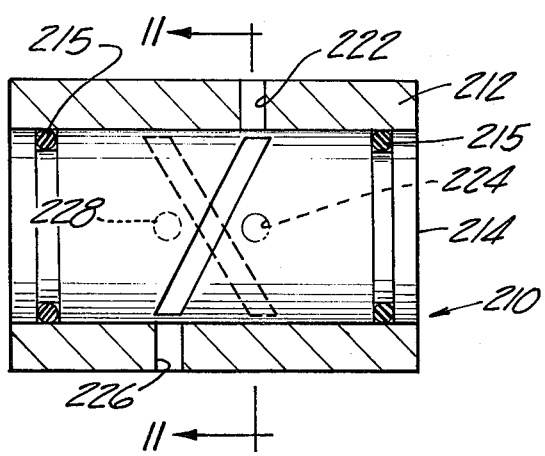
FIG. 10 illustrates the valve spool member of FIG. 9 in use.
Figure 11:
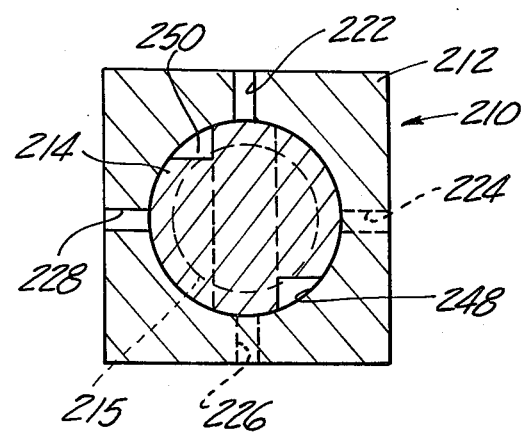
FIG. 11 is a cross sectional view taken substantially at lines 11—11 of FIG. 10.

Another alternative approach as illustrated in FIGS. 9-11, is similar to the first alternative, differing only in that annular segments 248 and 250 formed in the spool member 214 are not diametrically opposed. O-rings 215 are provided at the ends of the spool 214. The manner of forming the annular segments 248 and 250 increases the cross section of the spool member 214 over that of the spool member 114 in the plane of the material removal, providing added strength to the part. This spool design necessitates axial offsetting of the ports 222 and 228 from the ports 226 and 224 as may be seen in FIGS. 10 and 11.

Figure 12:
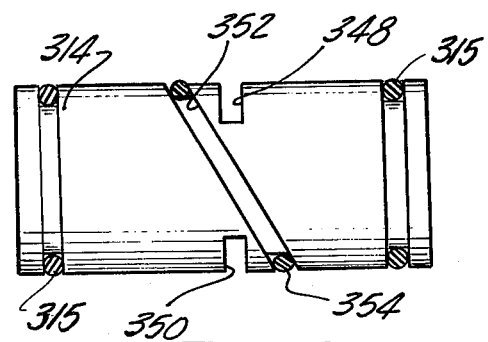
FIG. 12 is a plan view of yet another valve spool member of the present invention.

Another alternative approach is seen in FIG. 12. In this preferred embodiment the spool member 314 is identical to that of the other preferred embodiments in all respects except that the sealing means employed to isolate the annular segment 348 and 350 from each other are different. In this configuration a single, continuous groove 352 is formed having a substantially rectangular cross section and diagonally separating the annular segments 348 and 350. A seal 354 is carried in the groove 352. O-rings 315 are provided on the ends of the spool 314.

The advantages described above and others should be obvious to those skilled in the hydraulic art.

What is claimed is:

1. A rotary actuated directional control valve comprising:

a housing having formed therethrough a central through bore and a first set and a second set of fluid passages the axis of each of which set is perpendicular to the axis of said through bore and intersects said through bore and each of which consists of a first and a second bore;

a cylindrical valve spool member rotatably mounted in said through bore and having two annular passages formed in the exterior surface of said spool member on the opposite sides thereof, said annular passages being separated from each other and individually registering axially with said sets of fluid passages and each having a sufficient arc length to connect one of said diametrically opposed bores of said first set of fluid passages to a bore of said second set of fluid passages;

said first bore of said first set of fluid passages and said first bore of said second set of fluid passages intersect said through bore at a first axial position, and said second bore of said first set of fluid passages and said second bore of said second set of fluid passages intersect said through bore at a second axial position, said annular passages extend at an angle inclined to the axis of said spool member and for a length less than circumferentially around said spool member such that fluid communication is provided between bores at said first axial position and bores at said second axial position and in which a line perpendicular to the axis of said spool member through the center of one said annular passages will intersect the center of said other annular passage.

2. The valve as defined in claim 1 and including sealing means disposed on the ends of said spool member.

* * * * *